United States Patent [19]

Serafin

[11] Patent Number: 4,643,362

[45] Date of Patent: Feb. 17, 1987

[54] GRINDING AIDS FOR HYDRAULIC CEMENT

[75] Inventor: Frank G. Serafin, Peabody, Mass.

[73] Assignee: W. R. Grace & Co., Cambridge, Mass.

[21] Appl. No.: 803,380

[22] Filed: Dec. 2, 1985

[51] Int. Cl.$^4$ .................. C04B 7/14; B02C 23/00
[52] U.S. Cl. ........................ 241/16; 241/15; 106/90
[58] Field of Search ............... 241/15, 16, 22; 106/90, 106/102, 106, 314, 315

[56] References Cited

U.S. PATENT DOCUMENTS

| | | | |
|---|---|---|---|
| 2,203,809 | 6/1940 | Bechtold | 106/25 |
| 3,329,517 | 7/1967 | Dodson | 106/90 |
| 3,607,326 | 9/1971 | Serafin | 106/90 |
| 3,615,785 | 10/1971 | Moorer et al. | 106/90 |
| 4,386,963 | 6/1983 | Lange | 241/16 X |

*Primary Examiner*—Howard N. Goldberg
*Assistant Examiner*—Timothy V. Eley
*Attorney, Agent, or Firm*—Bart G. Newland; William L. Baker

[57] ABSTRACT

Hydraulic cements such as Portland cement are interground with diesters formed by reacting a polyol (e.g. alkylene glycol) with a monobasic carboxylic acid (e.g. acetic acid) to enhance the efficiency of the grinding operation.

8 Claims, No Drawings

GRINDING AIDS FOR HYDRAULIC CEMENT

BACKGROUND OF THE INVENTION

This invention relates to the grinding of hydraulic cements to reduce the particle size thereof, and more particularly to the addition of certain chemical additives to such cements during the grinding thereof to improve the efficiency of the grinding operation.

In the processing of hydraulic cements, for example Portland cement, a grinding operation is generally employed either in the unprocessed or semi-processed state to reduce the cement to relatively small particle size. It is desirable in the grinding step to have as efficient an operation as possible, that is, to reduce the particular cement to the desired size using as little energy as possible. Toward this end, it is customary to add during the grinding operation chemicals known as "grinding aids" without having adverse effects on the properties of the ground product.

Many chemicals and chemical mixtures have been suggested for use as grinding aids for hydraulic cements such as Portland cement. Examples of such chemicals which have been successfully commercially applied include triethanolamine salts of acetic acid (U.S. Pat. No. 3,329,517 to Serafin) and triethanolamine salts of phenol (U.S. Pat. No. 3,607,326 to Serafin).

U.S. Pat. No. 2,203,809 (Bechtold) relates to substituted glycerols and their use as grinding aids. One such substituted glycerol is glycerol monoacetic ester.

U.S. Pat. No. 3,615,785 (Moorer et al) relates to grinding aids of a water-soluble polyol (e.g. propylene glycol) in combination with a water-soluble salt of an aliphatic acid (e.g. acetic acid). Such combinations reportedly produce synergistic results over either compound alone. Esterification of the polyol and acid is neither disclosed nor suggested.

SUMMARY OF THE INVENTION

The present invention is based upon the discovery that diesters formed by reacting a polyol, e.g. mono and polyalkyl diols and triols with a monobasic carboxylic acid, e.g. acetic acid, are excellent grinding aids in the grinding of hydraulic cements such as Portland cement. Such esters are prepared by known reactions from readily available known starting materials. Moreover, many such esters are readily available from commercial sources.

Examples of grinding aids according to the present invention include compounds formed by the esterification of mono and polyalkyl polyols (ethylene glycol, propylene glycol, butylene glycol and $C_5$ to $C_{10}$ alkyl glycols; di-ethylene glycol, di-propylene glycol, and di-$C_4$ to $C_5$ alkyl glycols; tri-ethylene glycol; tetra-ethylene glycol; pentaethylene glycol; and $C_2$ to $C_{10}$ alkylidene glycols, as well as triols of the foregoing) by reacting the same with a mono-carboxylic acid (e.g. acetic acid, formic acid and propionic acid).

Most preferred as a grinding aid according to the present invention is ethylene diacetate (Ac—O—CH$_2$—O—Ac). Ethylene diacetate is prepared by known means and further is readily commercially available from a plurality of sources.

Alkyl polyols are readily esterified with conventional reagents such as acid chlorides, acid anhydrides and acids, and other esters via ester interchange. Mixtures of mono- and diesters are often formed in these reactions. Mono- or diesters are produced preferentially by controlling the molar ratio of reactants.

The pulverizing of hydraulic cements together with a grinding aid according to the invention increases the grinding efficiency, i.e. the mineral can be ground to the desired particle size with less energy than is required in the absence of such aid. This in turn increases the mill capacity and simultaneously reduces energy costs beyond the cost of the grinding aid.

The grinding aid according to the invention are particularly valuable in the case of cement and especially Portland cement. Portland cement is one of the hydraulic cements, which essentially consist of two calcium silicates and a smaller amount of calcium aluminate. Such cements are produced by processing an intimate mixture of a finely divided limestone, together with an argillaceous material to give a clinker, which is then ground together with approximately 2 to 5% of gypsum or some other calcium sulphate, in order to obtain the desired setting properties of the finished cement.

The grinding aids according to the invention are preferably added to the clinker, in order to increase the grinding effectiveness.

The grinding aid quantity can vary within wide limits, but preferably 0.001 to 1% by weight (of additive solids) and more particularly 0.005 to 0.05% by weight of grinding aid is used, based on the weight of the mineral solids (i.e. "solids on solids" or "s/s"). There is no upper limit for the added grinding aid quantity, but in general only that quantity required for obtaining the desired surface area in the most efficient mill operation is added.

The grinding aids according to the invention are preferably added alone, but can also be added together with one or more other grinding aids or other additives.

In the following Example, ethylene diacetate (obtained from Eastman Organic Chemicals, Rochester, N.Y., U.S.A.) was employed as a grinding aid at various addition rates (% s/s). The mill charge for each test grind consisted of a Portland cement of 95% clinker and 5%, gypsum. The steel to cement ratio (S/C) was 6.5, and the temperature of grinding was 220° F. (104° C.). Results of the grinding aid tests, including comparisons with ethylene glycol (a known grinding aid) appear in Table 1.

| Addition Rate % s/s | Blaine Surface Area, cm²/g | Total Mill Revolutions | Blaine Surface Area per Revolution | % Improvement over Blank |
|---|---|---|---|---|
| Blank | 2960 | 5540 | .5343 | — |
|  | 3059 | 5540 | .5522 | — |
|  | 3018 | 5766 | .5234 | — |
|  |  |  | x̄ = .5366 | — |
| Ethylene Glycol |  |  |  |  |
| .006 | 2915 | 5097 | .5719 | 6.6 |
| .012 | 2915 | 4931 | .5912 | 10.2 |
| .018 | 2915 | 4654 | .6263 | 16.7 |
| .024 | 2903 | 4487 | .6470 | 20.6 |
| Ethylene Diacetate |  |  |  |  |
| .006 | 2903 | 4549 | .6382 | 18.9 |
| .012 | 2948 | 4602 | .6406 | 19.4 |
| .018 | 2874 | 4444 | .6467 | 20.5 |
| .024 | 2874 | 4232 | .6791 | 26.6 |

As is shown by the above example, a grinding aid according to the present invention, when added to a Portland cement clinker, increases grinding efficiency over the clinker alone ("blank") as well as a known, chemically similar grinding aid (ethylene glycol). When grinding efficiency is increased, the ultimate cost of the grinding operation is reduced.

What is claimed is:

1. A method comprising grinding a hydraulic cement, to reduce the particle size thereof, in the presence of an additive comprising a diester formed by reacting a monocarboxylic acid with an alkylene polyol, the amount of said additive present being sufficient to enhance the efficiency of the grinding operation.

2. The method of claim 1 wherein said amount is about 0.001 to 1 percent by weight, based on the weight of the cement.

3. A method of claim 1 wherein said alkylene polyol contains 2 to 10 carbon atoms.

4. A method of claim 3 wherein said alkylene polyol is a diol.

5. A method of claim 1 wherein said monocarboxylic acid is a member of the group consisting of acetic acid, formic acid and propionic acid.

6. A method of claim 5 wherein said alkylene polyol contains 2 to 10 carbon atoms.

7. A method of claim 6 wherein said alkylene polyol is ethylene glycol.

8. A method of claim 1 wherein said additive is ethylene diacetate.

* * * * *